(12) United States Patent
Kobayashi

(10) Patent No.: US 7,728,582 B2
(45) Date of Patent: Jun. 1, 2010

(54) PULSAR RING OF A MAGNETIC ROTARY ENCODER HAVING A PULSAR MAIN BODY WITH A GUIDE PORTION

(75) Inventor: Naoto Kobayashi, Fukushima (JP)

(73) Assignee: NOK Corporation (JP)

( * ) Notice: Subject to any disclaimer, the term of this patent is extended or adjusted under 35 U.S.C. 154(b) by 296 days.

(21) Appl. No.: 11/887,314

(22) PCT Filed: Mar. 30, 2006

(86) PCT No.: PCT/JP2006/306612

§ 371 (c)(1),
(2), (4) Date: Sep. 27, 2007

(87) PCT Pub. No.: WO2006/106797

PCT Pub. Date: Oct. 12, 2006

(65) Prior Publication Data

US 2009/0096444 A1    Apr. 16, 2009

(30) Foreign Application Priority Data

Apr. 1, 2005    (JP) .............................. 2005-105804

(51) Int. Cl.
G01B 7/30    (2006.01)
G01P 3/44    (2006.01)

(52) U.S. Cl. .................... 324/174; 324/207.25; 384/448

(58) Field of Classification Search ........................ None
See application file for complete search history.

(56) References Cited

U.S. PATENT DOCUMENTS

2007/0257668 A1* 11/2007 Nakagawa et al. ..... 324/207.22

2007/0268013 A1* 11/2007 Yamamoto et al. .......... 324/174

FOREIGN PATENT DOCUMENTS

EP    0 745 857 A1    12/1996

(Continued)

OTHER PUBLICATIONS

International Search Report for PCT/JP2006/306612 dated May 31, 2006 (in English).

(Continued)

*Primary Examiner*—Jay M Patidar
(74) *Attorney, Agent, or Firm*—Harness, Dickey & Pierce, P.L.C.

(57) ABSTRACT

To hold a pulsar ring (1) of a magnetic rotary encoder well concentrically by a pressure inserting jig (4) when the pulsar ring is installed on a rotary body (3), the pulsar ring (1) comprises a metallic annular holder (10) and a pulsar main body (20) of a magnetic rubber material, the holder (10) comprises a disk portion (11) where the pulsar body (20) is bonded, a mounting tube portion (12) having a diameter smaller than the outer diameter of the disk portion (11) and being fixed to the rotary body (3), a fold-back portion (15) folded inward, and an intermediate portion (13) extending therefrom toward the mounting tube portion (12) so as to be separated from the disk portion (11), and the outer circumference of the fold-back portion (15) or a guide portion (22) mounted thereon is fitted to a circumferential wall portion (42) of the jig (4).

2 Claims, 14 Drawing Sheets

FOREIGN PATENT DOCUMENTS

| | | |
|---|---|---|
| JP | 08-327395 A | 12/1996 |
| JP | 2000-003821 A | 1/2000 |
| JP | 2003-035718 A | 2/2003 |
| JP | 2004-037356 A | 2/2004 |

OTHER PUBLICATIONS

Written Opinion for PCT/JP2006/306612 (in Japanese).
International Preliminary Report on Patentability for PCT/JP2006/306612 (in Japanese).

* cited by examiner

PULSAR RING OF A MAGNETIC ROTARY ENCODER HAVING A PULSAR MAIN BODY WITH A GUIDE PORTION

This is a national stage of the International Application No. PCT/JP2006/306612 filed Mar. 30, 2006 and published in Japanese.

BACKGROUND OF THE INVENTION

1. Field of the Invention

The present invention relates to a pulsar ring of a magnetic type rotary encoder detecting an angle of rotation and a rotating speed of a rotating body, in a motor vehicle, an industrial machine or the like.

2. Description of the Conventional Art

As a typical conventional art of a magnetic type rotary encoder, there have been known structures described in Japanese Unexamined Patent Publication No. 2003-35718.

FIGS. 13 to 15 are half cross sectional views showing a magnetic type rotary encoder in accordance with a conventional art described in Japanese Unexamined Patent Publication No. 2003-35718 by cutting with a plane passing through an axis.

The magnetic type rotary encoder shown in FIGS. 13 and 14 or FIG. 15 is constituted by a pulsar ring 100 attached to a rotating body (for example, an inner ring of a bearing unit) 120 to be measured with its rotation, and a magnetic sensor 110 arranged so as to be opposed to the pulsar ring 100.

The pulsar ring 100 is constituted by an annular holder 101 installed to the rotating body 120 and manufactured by a magnetic body metal, and a pulsar main body 102 integrally provided in a disc portion 101a of the holder 101. The pulsar main body 102 is molded by a magnetic rubber material obtained by mixing a ferrite powder to a rubber-like elastic material, and is structured such that N poles and S poles are alternately magnetized in a circumferential direction. Further, the magnetic sensor 110 is attached to a non-rotating housing (not shown) in a state of being opposed to the pulsar main body 102 so as to come close thereto in an axial direction.

In the conventional art shown in FIGS. 13 and 14, the holder 101 is constituted by the disc portion 101a provided with the pulsar main body 102, an outer circumferential tube portion 101b extending from an outer circumference thereof and having a large diameter than the rotating body 120, a mounting tube portion 101c having a smaller diameter than the outer circumferential tube portion 101b and being attached to an outer circumferential surface of the rotating body 120 in accordance with pressure insertion, and an intermediate portion 101d formed between the mounting tube portion 101c and the outer circumferential tube portion 101b. Further, the structure in FIG. 13 is different from FIG. 14, in a point that the outer circumferential portion of the pulsar main body 102 extends to the outer circumferential tube portion 101b side in the holder 101 so as to form the outer circumferential tube portion 102a.

On the other hand, in the conventional art shown in FIG. 15, the holder 101 is constituted by the disc portion 101a provided with the pulsar main body 102, a back surface collar portion 101e folded back to a back surface side thereof, and the mounting tube portion 101c extending cylindrically therefrom and being attached to an outer circumferential surface of the rotating body 120 in accordance with pressure insertion.

In this kind of magnetic rotary encoder, if the pulsar ring 100 is integrally rotated with the rotating body 120, the N poles and the S poles of the pulsar main body 102 of the pulsar ring 100 alternately pass through a front surface of the magnetic sensor 110, whereby the magnetic sensor 110 outputs a pulse-shaped signal having a wave form corresponding to a change of a magnetic field. Accordingly, it is possible to measure the rotation of the rotating body 120 on the basis of a count of the pulse.

In this case, FIG. 16 is a half cross sectional view showing a process of pressure inserting the pulsar ring in accordance with the conventional art of FIG. 13 to the rotating body by cutting with a plane passing through an axis, FIG. 17 is an explanatory view showing a state of accumulating the pulsar rings in FIG. 13 in such a manner that their axes are approximately vertical, and FIG. 18 is a partly cross sectional view showing a part of FIG. 17.

In order to pressure insert and install the mounting tube portion 101c of the holder 101 in the pulsar ring 100 to the outer circumferential surface of the rotating body 120, there is employed a pressure inserting jig 130 constituted by an end wall portion 131 pressing the disc portion 101a of the holder 101 via the pulsar main body 102, and a circumferential wall portion 132 capable of being fitted to the outer circumferential tube portion 102a of the pulsar main body 102 in FIG. 13, as shown in FIG. 16. In other words, the pulsar ring 100 is fitted into the pressure inserting jig 130 arranged coaxially with the rotating body 120 so as to be held, and the pressure inserting jig 130 is pressed to the rotating body 120 side in this state, thereby pressure inserting the mounting tube portion 101c of the holder 101 in the pulsar ring 100 to the outer circumferential surface of the rotating body 120 so as to close fit (refer to the Japanese Unexamined Patent Publication No. 2003-35718).

In this case, in order to hold the pulsar ring 100 at the concentric position with the rotating body 120 by the pressure inserting jig 130, it is necessary to make a precision of an outer diameter of the outer circumferential tube portion 102a of the pulsar main body 102 high so as to eliminate a play in a diametrical direction between the pressure inserting jig 130 and the circumferential wall portion 132, however, it is hard to precisely form the outer circumferential tube portion 102a of the pulsar main body 102. Accordingly, it becomes hard to fit the pressure inserting jig 130 to the pulsar ring 100 due to a dispersion of the outer diameter of the outer circumferential tube portion 102a in the pulsar main body 102, and the outer circumferential tube portion 102a of the pulsar main body 102 tends to be damaged. On the contrary, if a gap a in the diametrical direction is generated, it is impossible to concentrically hold the pulsar ring 100 by the pressure inserting jig 130, and there is a risk that the pulsar ring 100 is diagonally attached or deformed by being pressure inserted to the rotating body 120 in an axially deviated state. Further, the pulsar ring 100 in FIGS. 14 and 15 generates the same problem.

Further, in the pulsar ring 100 in FIG. 13 or 14, a collar portion 101f bent to an outer circumferential side is formed at an end portion of the mounting tube portion 101c in the holder 101 in order to prevent the pulsar main body 102 made of the magnetic rubber material from being damaged by the holder 101 placed thereon at a time of being accumulated in a plurality of stages in the axial direction as shown in FIG. 17. However, if a displacement is generated in the diametrical direction between the pulsar rings 100 in the accumulated state in FIG. 17 at a carrying time or a handling time, an edge portion 101f formed at a cut end portion of an outer circumference of the collar portion 101f is rubbed with a surface of the pulsar main body 102, and there is a risk that the pulsar main body 102 is damaged.

On the other hand, in the conventional art shown in FIG. 15, a portion having a U-shaped cross section and being constituted by the disc portion 101a and the back surface collar portion 101e is formed in the holder 101 in accordance with a press work collapsing a metal pipe in the axial direction, it is hard to make precision of an outer diameter D of the portion constituted by the disc portion 101a and the back surface collar portion 101e high. Accordingly, there is a problem that guide by the pressure inserting jig 130 (refer to FIG. 16) becomes hard as described previously.

Further, a degreasing cleaning is executed as a preliminary treatment step at a time of integrally forming the pulsar main body 102 made of the magnetic rubber material on the holder 101, however, there is a problem that it is impossible to easily remove a working oil making an intrusion into a narrow gap 101g between contacted surfaces of the disc portion 101a and the back surface collar portion 101e at a time of press forming the holder 101. Further, the residual working oil mentioned above splashes in all directions at a time of being used, or the residual working oil flows out from the narrow gap 101g to spread to an adhesion surface at a time of vulcanizing and adhering the pulsar main body 102, and there is a risk that an adhesive failure is caused.

SUMMARY OF THE INVENTION

Problem to be Solved by the Invention

The present invention is made by taking the points mentioned above into consideration, and a technical object of the present invention is to provide a pulsar ring which can be well held concentrically by a pressure inserting jig at a time of being installed to a rotating body.

Further, another object of the present invention is to provide a pulsar ring in which a pulsar main body made of a magnetic rubber material is not damaged by a holder placed thereon at a time of being accumulated in a plurality of stages in an axial direction.

Further, another object of the present invention is to provide a pulsar ring having a structure in which an adhesive failure between a holder and a pulsar main body is not generated at a time of forming a pulsar main body.

Means for Solving the Problem

As a means for effectively solving the technical problems mentioned above, in accordance with a first aspect of the present invention, there is provided a pulsar ring of a magnetic type rotary encoder comprising:

an annular holder made of a metal; and a pulsar main body integrally formed on the holder by a magnetic rubber material, wherein the holder is provided with a disc portion to which the pulsar main body is bonded, a mounting tube portion having a smaller diameter than an outer diameter of the disc portion and being fixed to a rotating body, a fold-back portion folded back to an inner circumferential side from an outer circumference of the disc portion so as to be formed in a curved shape having a round-shaped outer circumferential convex surface, and an intermediate portion extending to the mounting tube portion in such a direction as to be apart from the disc portion via the fold-back portion, and wherein an outer circumferential portion of the pulsar main body is provided with a guide portion which is formed so as to surround the round-shaped outer circumferential convex surface of the fold-back portion in the holder and is capable of coming into close contact with an inner circumferential surface of a circumferential wall portion of a pressure inserting jig with a suitable collapsing margin.

Further, in accordance with a second aspect of the present invention, there is provided a pulsar ring of a magnetic type rotary encoder as recited in the first aspect, wherein a bent end inclined toward the mounting tube portion side than a plane which is vertical to an axis is formed at an end portion at an opposite side to the disc portion of the holder.

EFFECT OF THE INVENTION

In accordance with the pulsar ring of the magnetic type rotary encoder on the basis of the first aspect of the present invention, since it is possible to improve precision of the outer diameter of the holder by the fold-back portion formed in the curved shape having the round-shaped outer circumferential convex surface by being folded back to the inner circumferential side from the outer circumference of the disc portion of the holder, and the guide portion formed so as to surround the round-shaped outer circumferential convex surface of the fold-back portion from the pulsar main body is brought into close contact with the inner circumferential surface of the circumferential wall portion of the pressure inserting jig with the suitable collapsing margin, it is possible to prevent inability of fitting to the pressure inserting jig due to a slight dimensional tolerance, prevent a damage caused at a time of fitting, and prevent generation of a play with respect to the pressure inserting jig. Therefore, installation is easy, and it is possible to prevent an installation fault due to an axial displacement. Further, since the intermediate portion of the holder is apart from the disc portion, the oil used at a time of working the holder neither makes an intrusion into the portion between the disc portion and the intermediate portion nor stay there, and it is possible to prevent a problem caused by the residual oil mentioned above.

In accordance with the pulsar ring of the magnetic type rotary encoder on the basis of the second aspect of the present invention, it is possible to prevent the pulsar main body made of the magnetic rubber material from being damaged by the holder placed on the pulsar main body at a time of accumulating them in such a manner that the axes thereof are approximately vertical.

DETAILED DESCRIPTION OF PREFERRED EMBODIMENT

Figure 2:
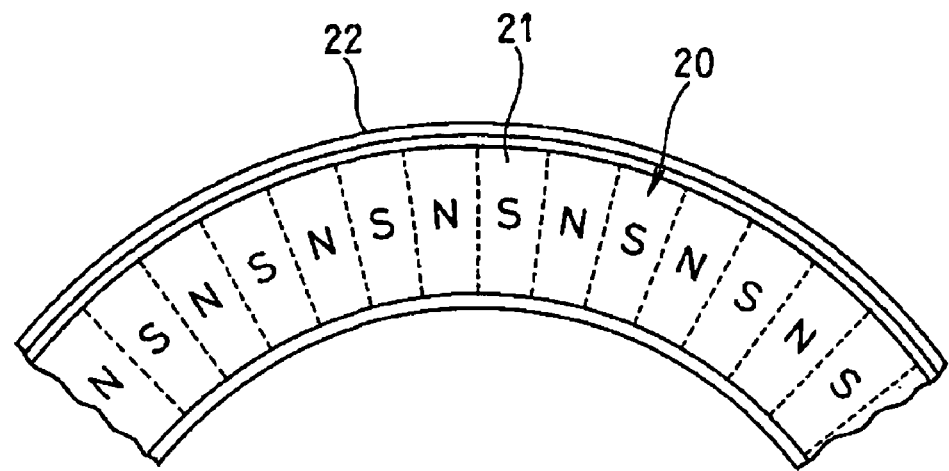
FIG. 2 is a view showing the pulsar ring in FIG. 1 in a direction II in FIG. 1.
Figure 3:
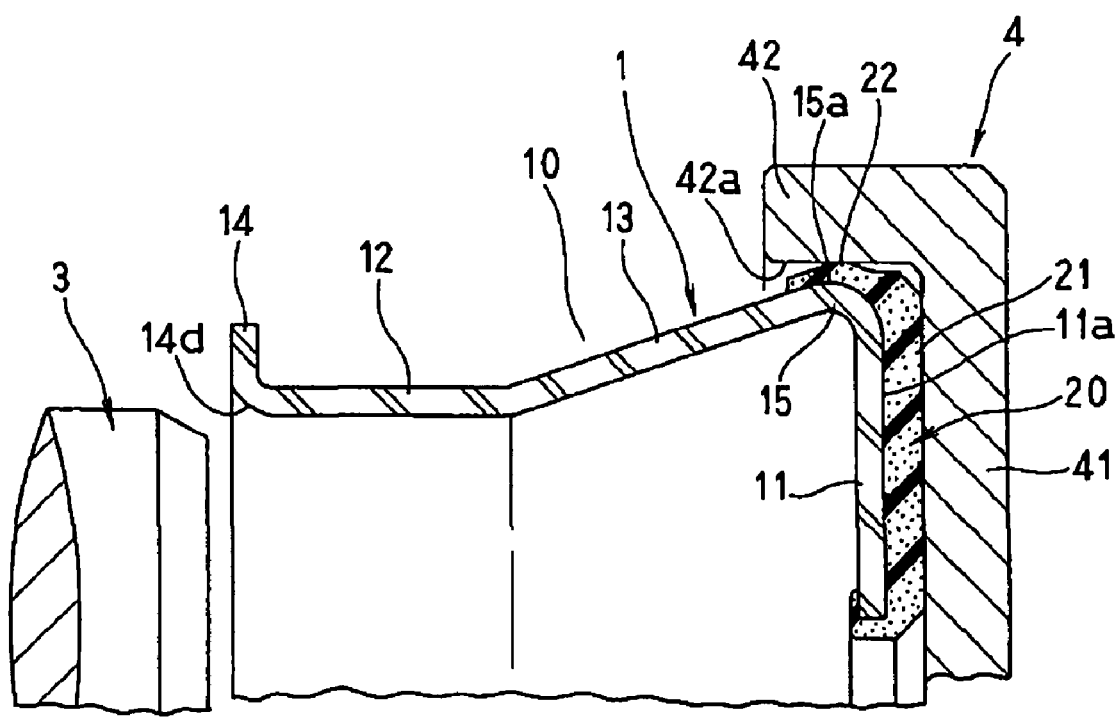
FIG. 3 is a half cross sectional view showing a process of pressure inserting the pulsar ring in FIG. 1 to a rotating body by cutting with a plane passing through the axis.

A description will be in detail given below of a preferable embodiment of a pulsar ring of a magnetic type rotary encoder in accordance with the present invention with reference to the accompanying drawings. First, FIG. 1 is a half cross sectional view of an installed state showing a first embodiment of a pulsar ring of a magnetic type rotary encoder in accordance with the present invention by cutting with a plane passing through an axis O, FIG. 2 is a view showing the pulsar ring in FIG. 1 in a direction II in FIG. 1, and FIG. 3 is a half cross sectional view showing a process of pressure inserting the pulsar ring in FIG. 1 to a rotating body by cutting with a plane passing through the axis.

Figure 1:
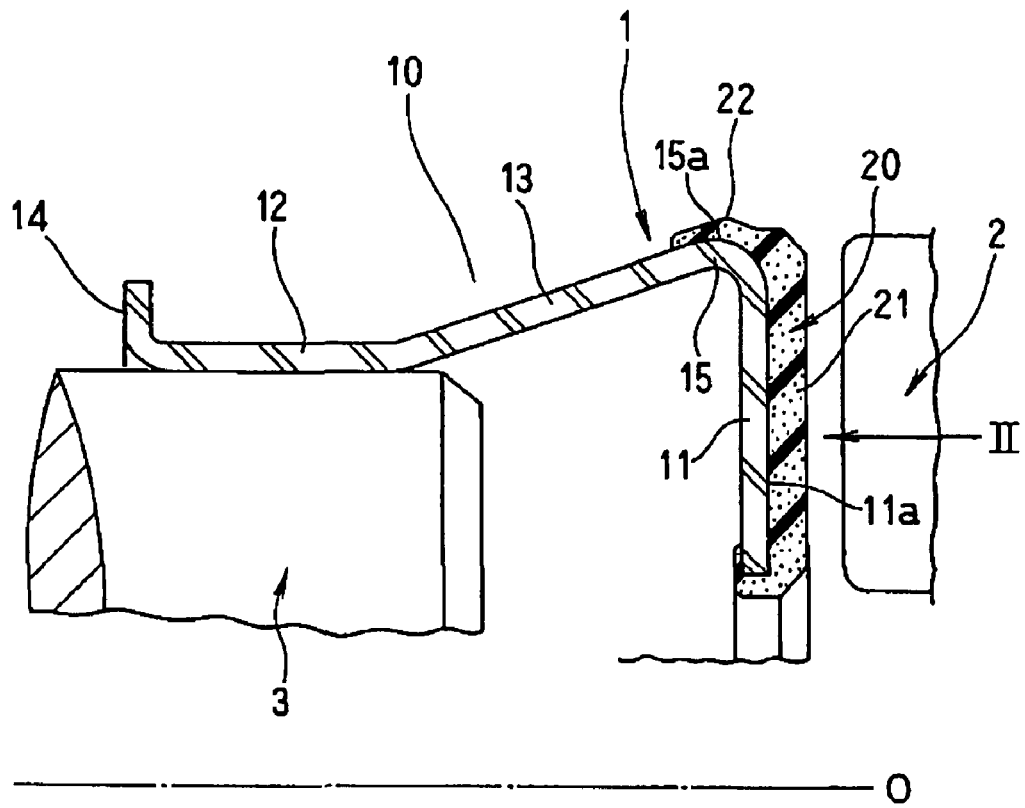
FIG. 1 is a half cross sectional view of an installed state showing a first embodiment of a pulsar ring of a magnetic type rotary encoder in accordance with the present invention by cutting with a plane passing through an axis O.

In FIG. 1, reference numeral 1 denotes a pulsar ring, reference numeral 2 denotes a magnetic sensor constructing the magnetic type rotary encoder together with the pulsar ring 1, and reference numeral 3 denotes a rotating body to be measured with its rotation. The pulsar ring 1 is constituted by a holder 10, and a pulsar main body 20 integrally bonded to the holder 10.

The holder 10 in the pulsar ring 1 is manufactured by punching and press forming of a metal plate such as an iron plate or the like, and is provided with a disc portion 11 to which the pulsar main body 20 is bonded, a mounting tube portion 12 having a smaller diameter than an outer diameter of the disc portion 11 and fitted and fixed by pressure insertion to an outer circumferential surface of the rotating body 3 with a desired fastening margin, a fold-back portion 15 folded back to an inner circumferential side from an outer circumference of the disc portion 11 so as to be formed in a curved shape having an round-shaped outer circumferential convex surface 15a, an intermediate portion 13 extending to the mounting tube portion 12 so as to be apart from the disc portion 11 via the fold-back portion 15 and being formed in a conical tubular shape which becomes smaller in diameter gradually toward the mounting tube portion 12 side, and a bent end 14 formed at an end portion at an opposite side to the intermediate portion 13 in the mounting tube portion 12 and bent to an outer circumferential side.

The pulsar main body 20 in the pulsar ring 1 is constituted by a magnetic rubber material obtained by mixing a magnetic powder such as a ferrite or the like to a rubber-like elastic material, and is structured by being integrally vulcanized and bonded at the same time of being molded, from an outer side surface 11a of the disc portion 11 of the holder 10 to a round-shaped outer circumferential convex surface 15a of the fold-back portion 15. N poles and S poles are magnetized alternately in a circumferential direction, as shown in FIG. 2, in a disc-like magnetized portion 21 of the pulsar main body 20.

An outer circumferential portion of the pulsar main body 20 surrounding the round-shaped outer circumferential convex surface 15a of the fold-back portion 15 in the holder 10 forms a guide portion 22. The guide portion 22 is formed in a shape protruding to an outer circumferential side continuously or intermittently in the circumferential direction or in a seal lip shape.

The magnetic sensor 2 is structured such as to detect a change of a magnetic field by a Hall element or a magnetic resistance element or the like so as to output an electric signal, and is attached to a housing (not shown) in a state that a detection surface comes close to and opposes to the disc-like magnetized portion 21 of the pulsar ring main body 20 in the pulsar ring 1 in an axial direction.

In the magnetic type rotary encoder provided with the structure mentioned above, if the rotating body 3 is rotated around its axis O, the pulsar ring 1 is integrally rotated. Accordingly, the N poles and the S poles alternately magnetized in the circumferential direction in the disc-like magnetized portion 21 of the pulsar main body 20 sequentially pass through an opposing position of the detection surface of the magnetic sensor 2 in a circumferential direction. Therefore, since the magnetic sensor 2 outputs a signal having a wave form corresponding to the change of the magnetic flux, and a frequency thereof is in proportion to a rotating speed of the rotating body 3, it is possible to detect a rotating speed and an angle of rotation of the rotating body 3, and it is possible to be applied to various controls.

A pressure inserting jig 4 shown in FIG. 3 is used for installing the pulsar ring 1 to the rotating body 3. The pressure inserting jig 4 is formed in a closed-end cylindrical shape capable of fitting to the pulsar main body 20 of the pulsar ring 1, and is constituted by a disc-like end wall portion 41 capable of coming into close contact with the disc-like magnetized portion 21 of the pulsar main body 20, and a cylindrical circumferential wall portion 42 protruding in an axial direction from an outer circumference thereof and being structured such that the guide portion 22 of the pulsar main body 20 can come into close contact with the inner circumferential surface 42a with a suitable collapsing margin.

In other words, at a time of installing the pulsar ring 1 to the rotating body 3, the pulsar ring 1 is fitted to the pressure inserting jig 4 arranged concentrically with the rotating body 3 so as to be held, as shown in FIG. 3. At this time, since the protruding shaped or seal lip shaped guide portion 22 formed in the outer circumferential portion of the pulsar main body 20 comes into close contact with the inner circumferential surface 42a of the circumferential wall portion 42 of the pressure inserting jig 4 with a suitable collapsing margin, and the disc-like magnetized portion 21 of the pulsar main body 20 is brought into close contact with the end wall portion 41 of the pressure inserting jig 4, the pulsar ring 1 is concentrically held with respect to the rotating body 3.

Further, in this state, the mounting tube portion 12 of the holder 10 in the pulsar ring 1 is pressure inserted to the outer circumferential surface of the rotating body 3 so as to be closely fitted by moving and pressing the pressure inserting jig 4 to the rotating body 3 side in the axial direction. At this state, since the pulsar ring 1 is held to the pressure inserting jig 4 concentrically with the rotating body 3, as mentioned above, it is possible to smoothly attach, and it is possible to prevent a problem that the pulsar ring 1 is diagonally attached and the holder 10 is deformed by being pressure inserted to the rotating body 3 in the axially displaced state. Further, since an inner circumferential portion of the bent end 14 of the holder 10 is formed as a round surface 14d in accordance with a bending work, it is possible to smoothly pressure insert without generating a galling with respect to an end portion of the rotating body 3 in the process of the pressure insertion.

Further, since the guide portion 22 formed at the outer circumferential portion of the pulsar main body 20 has a protruding shape or a seal lip shape, a rigidity (a spring constant) is made low, and accordingly, there is no case of inability of fitting to the pressure inserting jig 4 due to a slight dimensional tolerance. Further, since a suitable collapsing margin can be set with respect to the inner circumferential surface 42a of the circumferential wall portion 42 of the pressure inserting jig 4, a play is not generated.

Further, working oil is used at a time of press forming molding the holder 10, however, since the intermediate portion 13 extends like the conical tubular shape toward the mounting tube portion 12 in such a direction as to be apart from the disc portion 11 via the fold-back portion 15 formed in the curved shape having the round-shaped outer circumferential convex surface 15a in this embodiment, there can not be generated a matter that the working oil remains between the disc portion 11 and the intermediate portion 13 without being removed in a degreasing cleaning process executed as a preliminary treatment for integrally molding the pulsar main body 20. Therefore, it is possible to prevent a problem that the remaining working oil splashes in all directions at a time of using, or that the remaining working oil spreads to the adhesion surface so as to cause an adhesive failure at a time of vulcanizing and adhering the pulsar main body 20.

Figure 4:
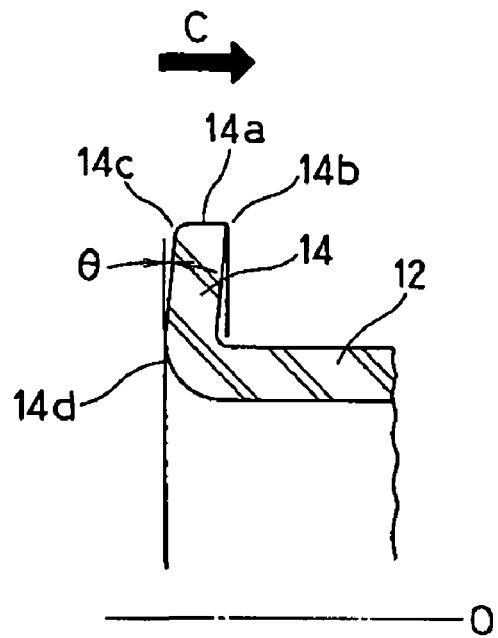
FIG. 4 is a partly cross sectional view showing a shape of a bent end which can be applied to a holder of the pulsar ring in FIG. 1.
Figure 5:
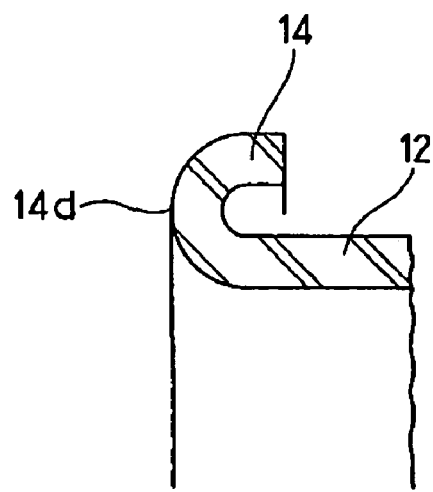
FIG. 5 is a partly cross sectional view showing another shape of the bent end which can be applied to the holder of the pulsar ring in FIG. 1.
Figure 6:
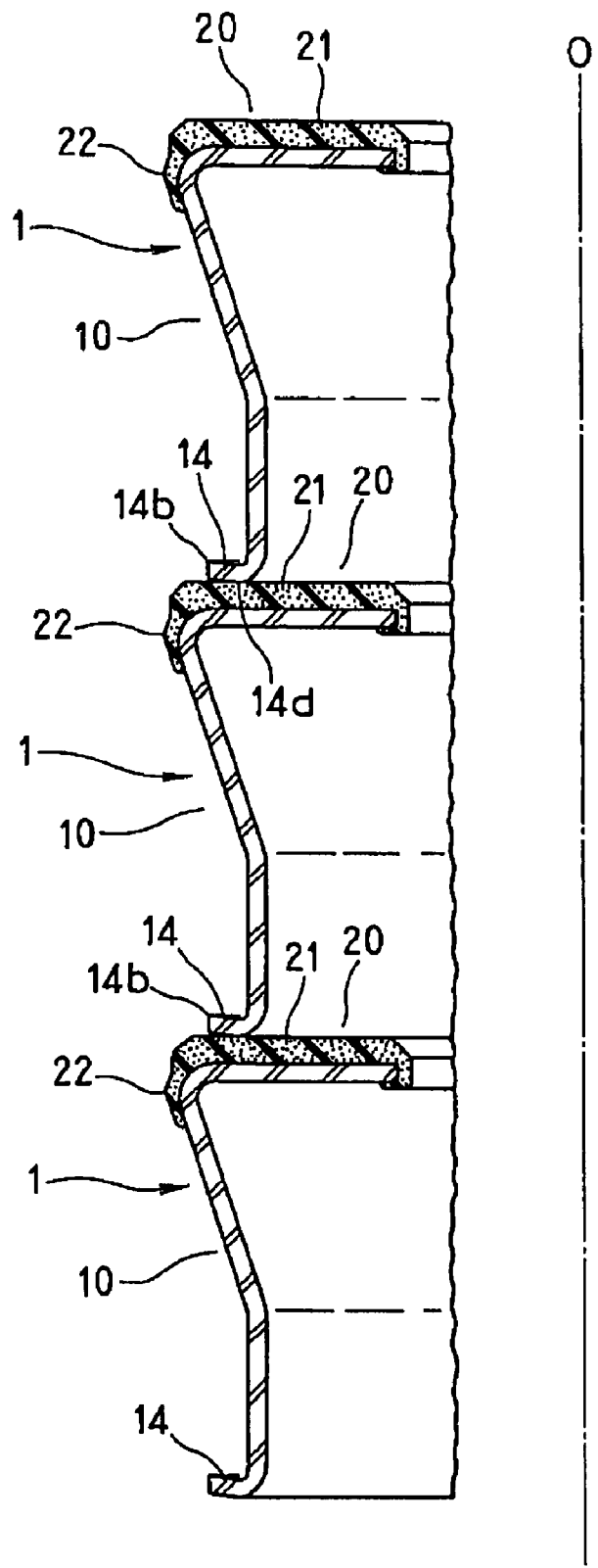
FIG. 6 is an explanatory view showing a state of accumulating the pulsar rings in FIG. 1 in such a manner that their axes are approximately vertical.

Next, FIGS. 4 and 5 are partly cross sectional views showing a shape of a bent end which can be applied to the holder of the pulsar ring in FIG. 1, and FIG. 6 is an explanatory view showing a state of accumulating the pulsar rings in FIG. 1 in such a manner that their axes are approximately vertical.

First, the bent end 14 of the holder 10 shown in FIG. 4 is formed in a conical surface shape inclining at a slight incline angle θ toward the mounting tube portion 12 side than the vertical plane with respect to the axis O. Further, the bent end 14 is made in such manner that, as shown by an arrow C in FIG. 4, a cutting surface 14a at an outer circumference is punched from an opposite side to the mounting tube portion 12 (an outer side), whereby a burr at a time of cutting is formed at an edge 14b at the mounting tube portion 12 side, and an opposite side edge 14c, that is, an edge 14c at the side of a contact surface with the pulsar main body 20 at a time of accumulating the pulsar rings 1 as shown in FIG. 6 is formed in a round shape.

Further, the bent end 14 of the holder 10 shown in FIG. 5 is formed in a cylindrical surface shape which inclines (is folded back) in a U-shape toward the mounting tube portion 12 side than the plane vertical to the axis O.

As shown in FIG. 6, in a state of accumulating the pulsar rings 1 in such a manner that their axes O are approximately vertical, the bent end 14 of the holder 10 of the pulsar ring 1 positioned relatively at an upper side is placed on the pulsar main body 20 of the pulsar ring 1 positioned relatively at a lower side. Further, the bent end 14 formed as shown in FIG. 4 comes into contact with the pulsar main body 20 at the round surface 14d at the outer side of the bending of the bent end 14, and the edge 14b where the burr at a time of cutting exists does not come into contact with the pulsar main body 20. Accordingly, the pulsar main body 20 made of the magnetic rubber material is not damaged by the holder 10.

Further, the bent end 14 formed as shown in FIG. 5 comes into contact with the pulsar main body 20 at the round surface 14d at the outer side of the bending of the bent end 14 at a time of accumulating the pulsar rings 1 as shown in FIG. 6, and both side edges of the cutting surface 14a do not come into contact with the pulsar main body 20. Accordingly, the pulsar main body 20 made of the magnetic rubber material is not damaged by the holder 10.

Figure 7:
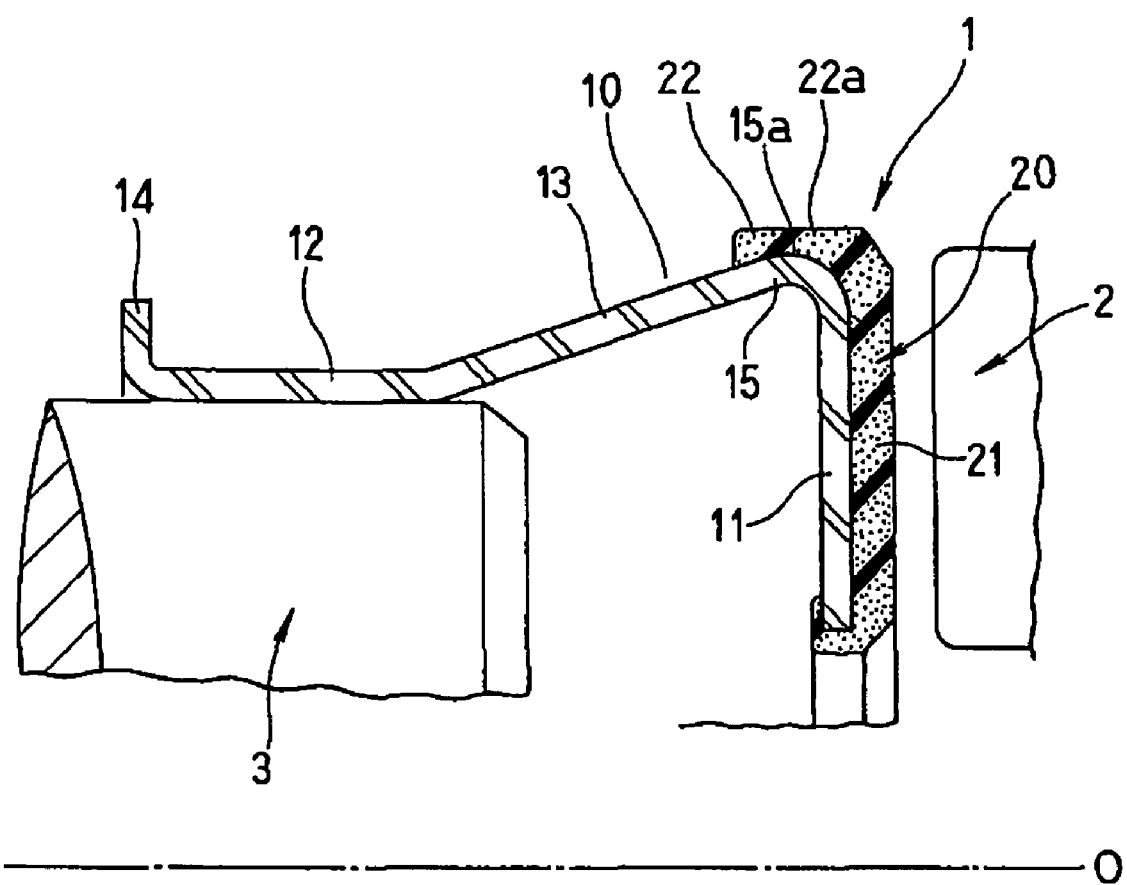
FIG. 7 is a half cross sectional view of an installed state showing a second embodiment of the pulsar ring of the magnetic type rotary encoder in accordance with the present invention by cutting with a plane passing through an axis O.
Figure 8:
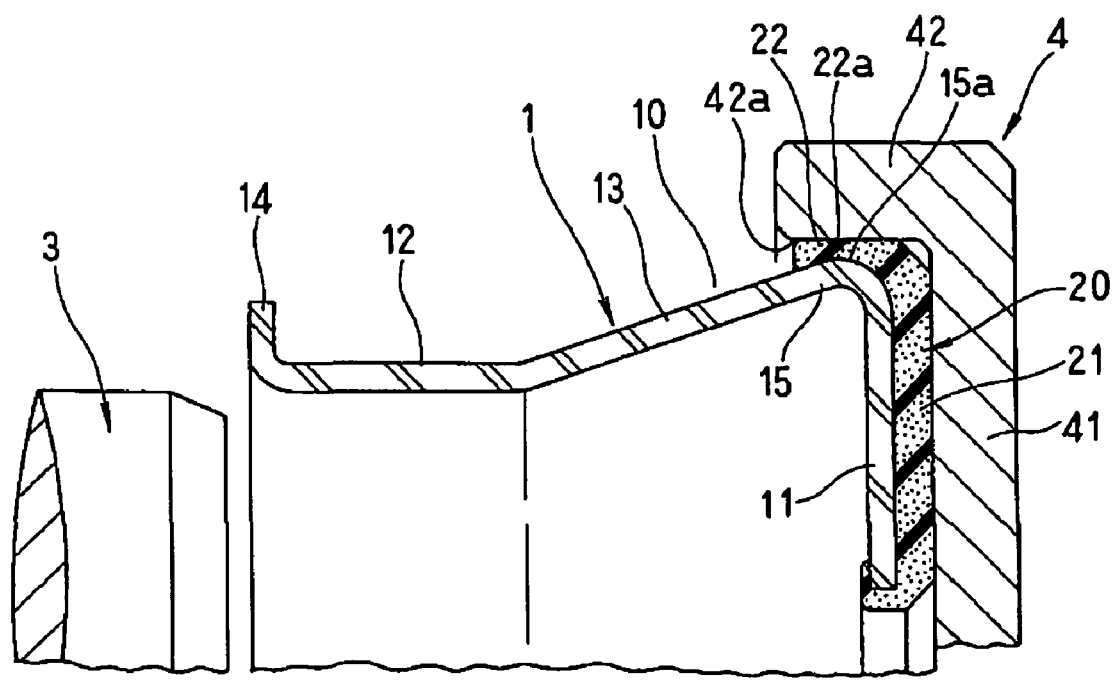
FIG. 8 is a half cross sectional view showing a process of pressure inserting the pulsar ring in FIG. 7 to a rotating body by cutting with a plane passing through the axis.

Next, FIG. 7 is a half cross sectional view of an installed state showing a second embodiment of the pulsar ring of the magnetic type rotary encoder in accordance with the present invention by cutting with a plane passing through an axis O, and FIG. 8 is a half cross sectional view showing a process of pressure inserting the pulsar ring in FIG. 7 to a rotating body by cutting with a plane passing through the axis. This embodiment is different from the first embodiment mentioned above in a point that the outer circumferential surface of the guide portion 22 formed in the outer circumferential portion of the pulsar main body 20 has a cylindrical surface 22a. The other portions are structured in the same manner as those in FIG. 1.

In accordance with this structure, since the outer circumferential surface of the guide portion 22 of the pulsar main body 20 has the cylindrical surface 22a, whereby a contact width with respect to the inner circumferential surface 42a of the circumferential wall portion 42 of the pressure inserting jig 4 is enlarged in an axial direction at a time of fitting the pulsar ring 1 to the pressure inserting jig 4 arranged concentrically with the rotating body 3, as shown in FIG. 8, in the case of installing the pulsar ring 1 to the rotating body 3, it is possible to effectively prevent the axial displacement from being generated by the incline of the pulsar ring 1. Further, since the guide portion 22 is formed on the round-shaped outer circumferential convex surface 15a of the fold-back portion 15 in the holder 10, a thickness in a diametrical direction of the guide portion 22 is increased gradually toward both sides of the maximum diameter portion of the round-shaped outer circumferential convex surface 15a, and a rigidity (a spring constant) is accordingly lowered. Therefore, since there is no inability of fitting to the pressure inserting jig 4 due to a slight dimensional tolerance, and a suitable collapsing margin can be set with respect to the inner circumferential surface 42a of the circumferential wall portion 42 of the pressure inserting jig 4, in the same manner as the first embodiment, a play is not generated.

Figure 9:
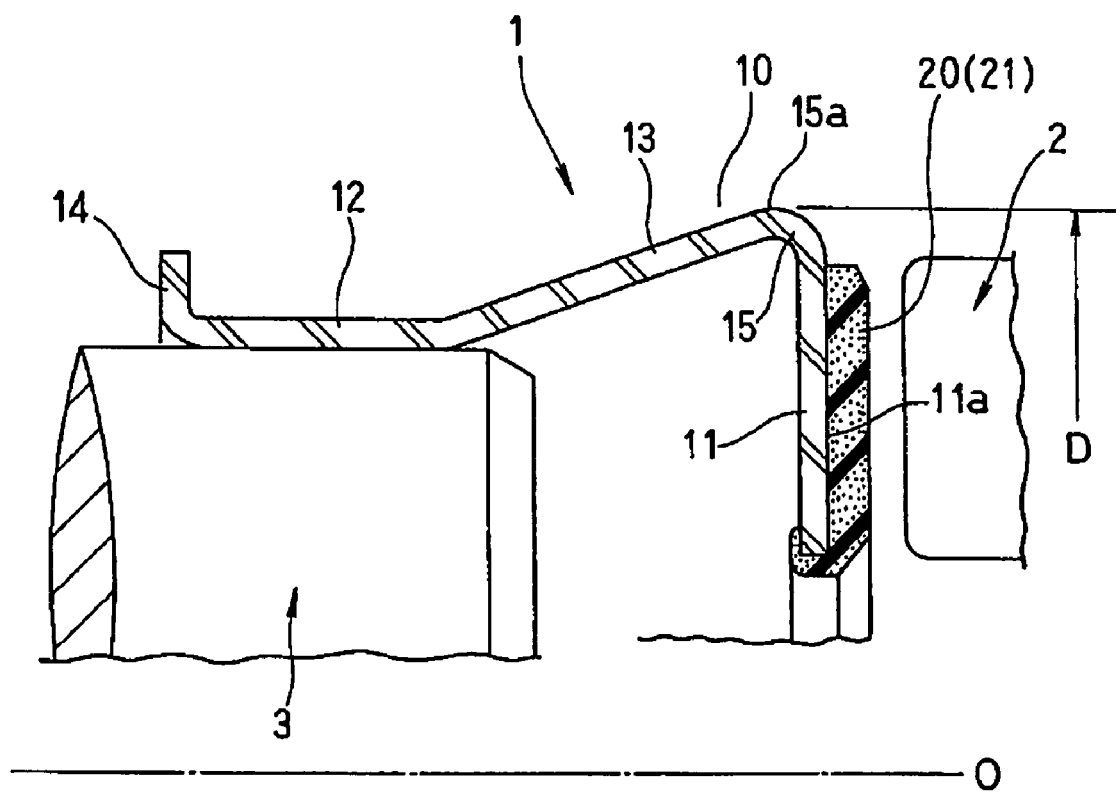
FIG. 9 is a half cross sectional view of an installed state showing a third embodiment of the pulsar ring of the magnetic type rotary encoder in accordance with the present invention by cutting with a plane passing through an axis O.
Figure 10:
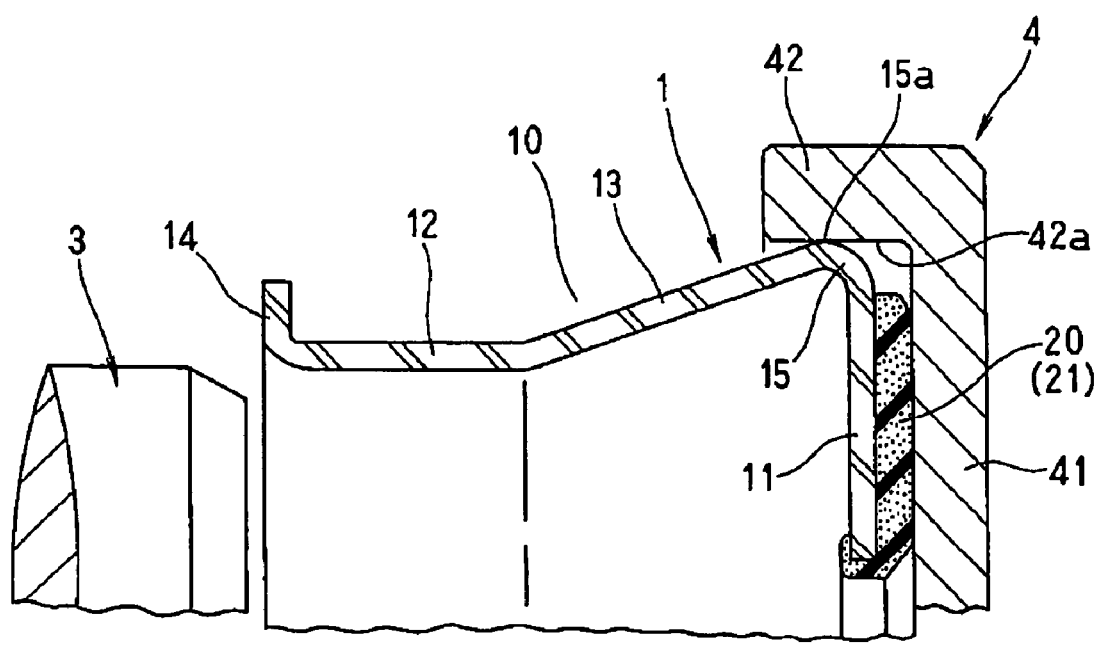
FIG. 10 is a half cross sectional view showing a process of pressure inserting the pulsar ring in FIG. 9 to a rotating body by cutting with a plane passing through the axis.

Next, FIG. 9 is a half cross sectional view of an installed state showing a third embodiment of the pulsar ring of the magnetic type rotary encoder in accordance with the present invention by cutting with a plane passing through an axis O, and FIG. 10 is a half cross sectional view showing a process of pressure inserting the pulsar ring in FIG. 9 to a rotating body by cutting with a plane passing through the axis. This embodiment is different from the first and second embodiments mentioned above in a point that the pulsar main body 20 is provided only on the outer side surface 11a of the disc portion 11 of the holder 10, that is, the pulsar main body 20 is constituted only by the disc-shaped magnetized portion 21, and the guide portion 22 shown in FIG. 1 or 7 is not formed. The other portions are structured in the same manner as those in FIG. 1.

In accordance with this structure, the round-shaped outer circumferential convex surface 15a of the fold-back portion 15 formed at the outer circumference of the disc portion 11 in the holder 10 is fitted to the inner circumferential surface 42a of the circumferential wall portion 42 of the pressure inserting jig 4 at a time of fitting the pulsar ring 1 to the pressure inserting jig 4 arranged concentrically with the rotating body 3, as shown in FIG. 10, whereby the pulsar ring 1 is held concentrically with the rotating body 3. Further, since precision of an outer diameter D (an outer diameter of the round-shaped outer circumferential convex surface 15a) shown in FIG. 9 can be made high by forming the holder 10 in the shape mentioned above, it is possible to prevent inability of fitting to the pressure inserting jig 4, and prevent generation of a play.

Figure 11:
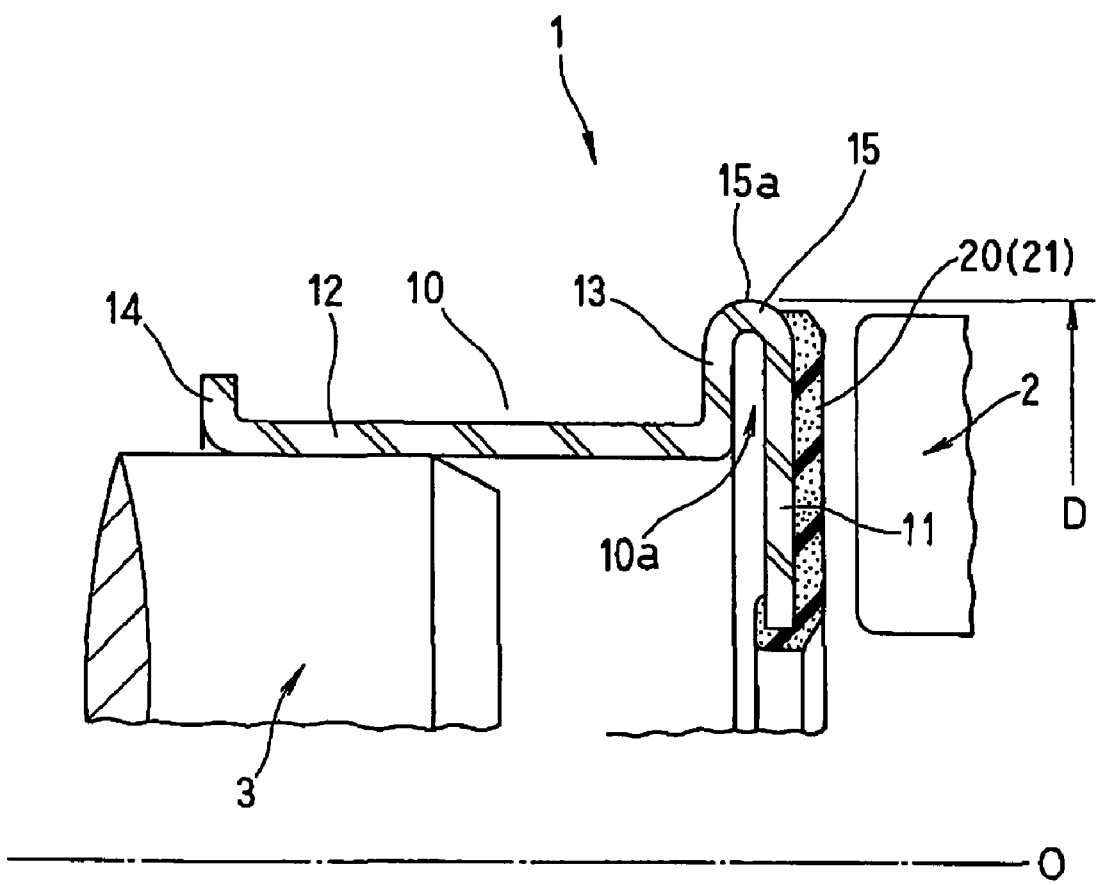
FIG. 11 is a half cross sectional view of an installed state showing a fourth embodiment of the pulsar ring of the magnetic type rotary encoder in accordance with the present invention by cutting with a plane passing through an axis O.
Figure 12:
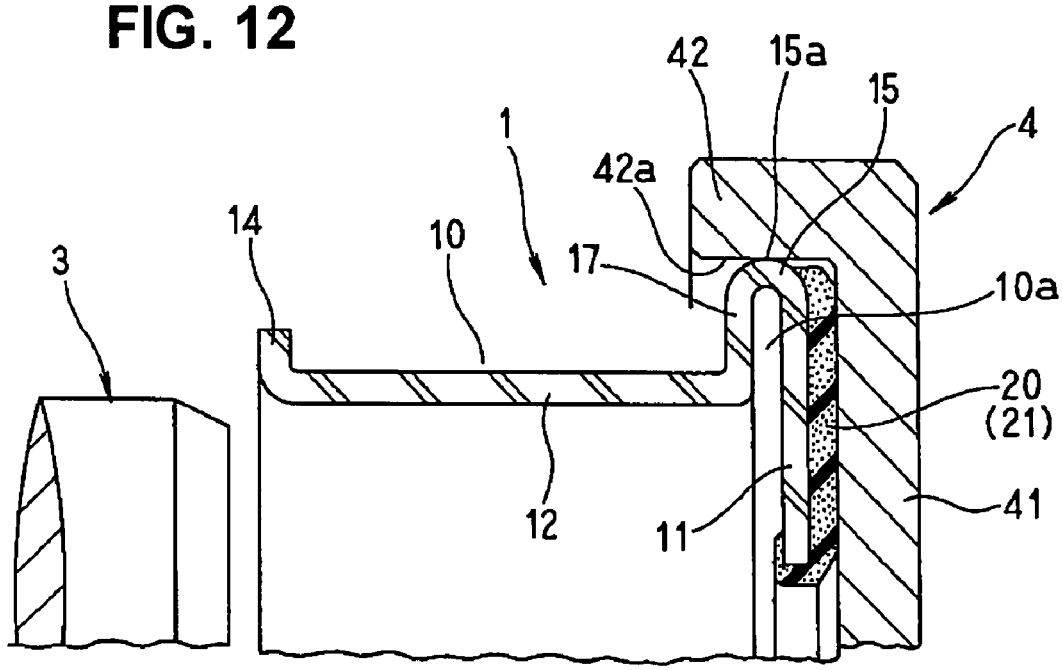
FIG. 12 is a half cross sectional view showing a process of pressure inserting the pulsar ring in FIG. 11 to a rotating body by cutting with a plane passing through the axis.
Figure 13:
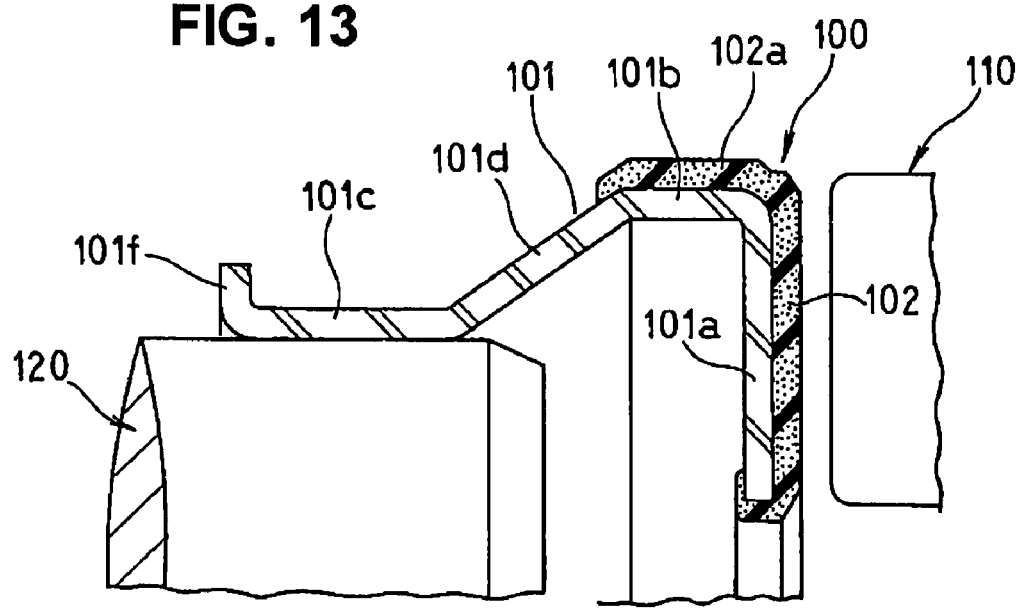
FIG. 13 is a half cross sectional view of a magnetic type rotary encoder in accordance with a conventional art by cutting with a plane passing through an axis O.
Figure 14:
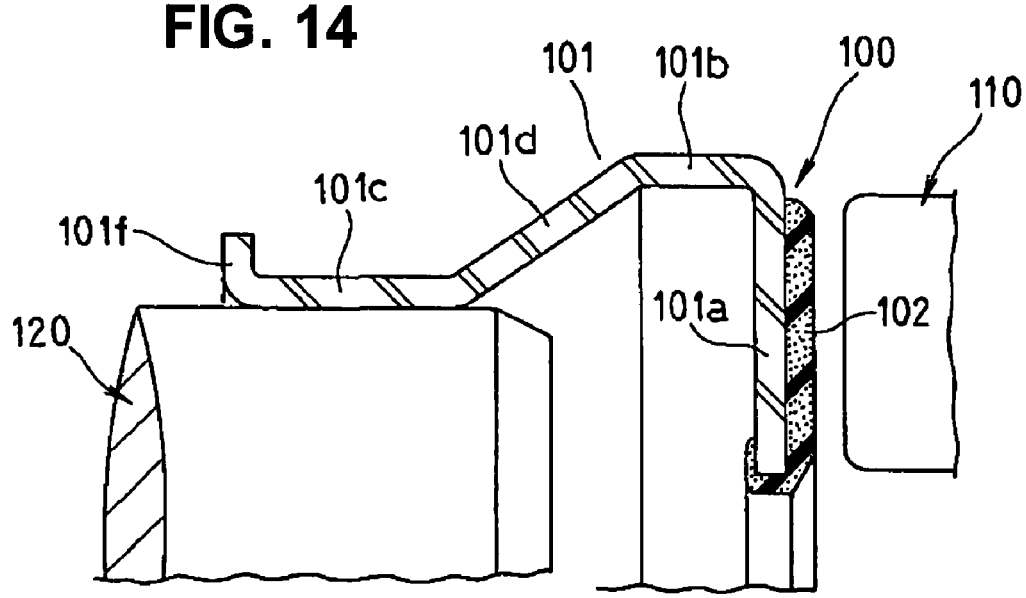
FIG. 14 is a half cross sectional view of a magnetic type rotary encoder in accordance with a conventional art by cutting with a plane passing through an axis O.
Figure 15:
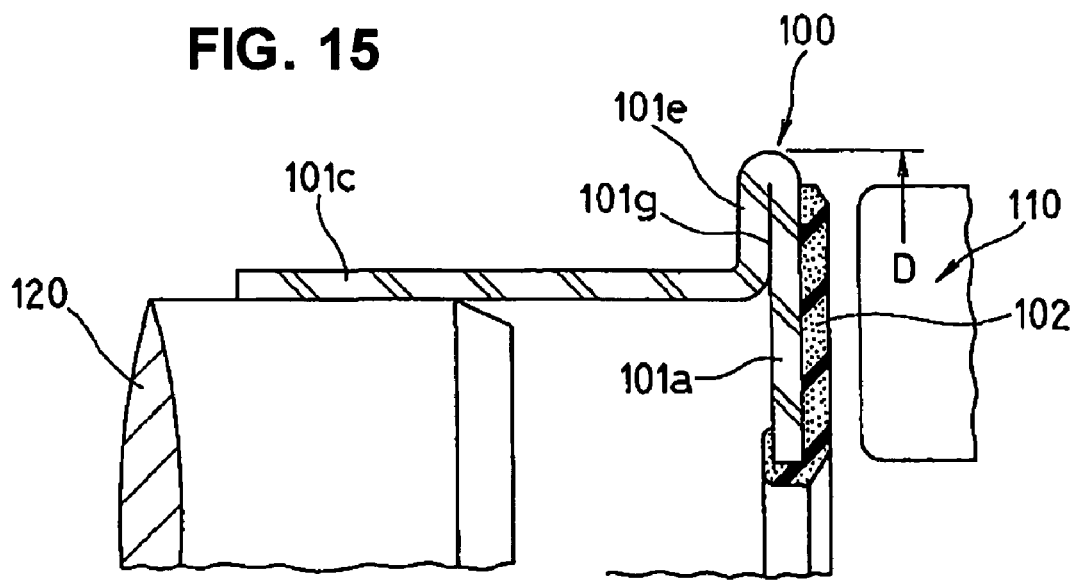
FIG. 15 is a half cross sectional view of a magnetic type rotary encoder in accordance with a conventional art by cutting with a plane passing through an axis O.
Figure 16:
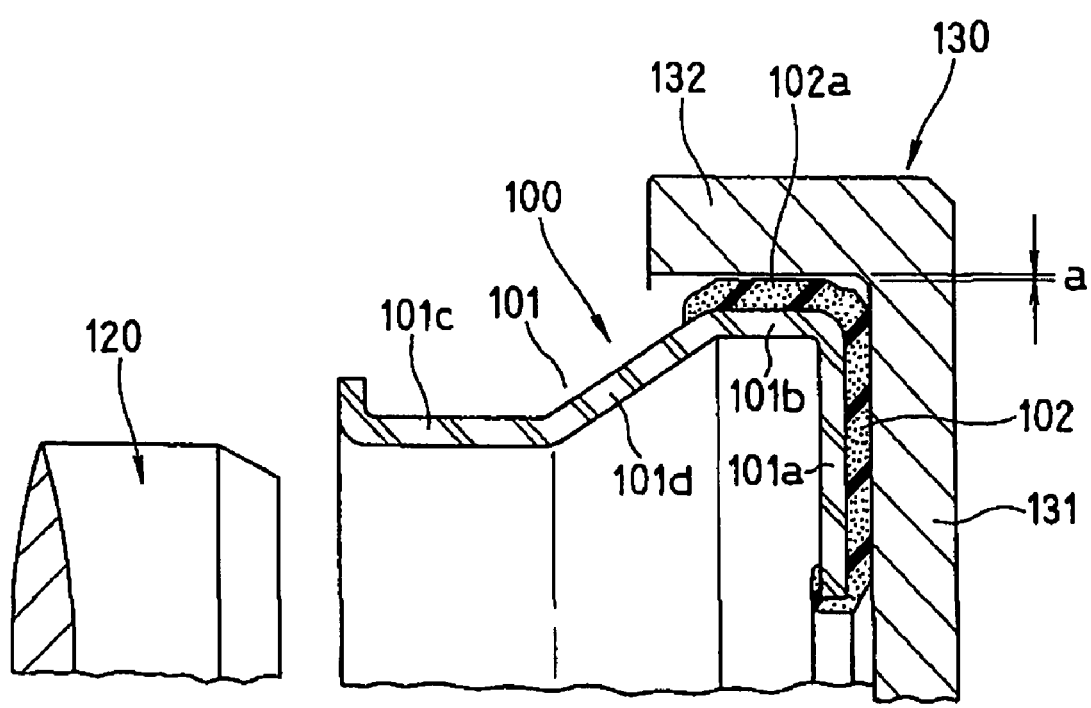
FIG. 16 is a half cross sectional view showing a process of pressure inserting the pulsar ring in FIG. 13 to a rotating body by cutting with a plane passing through the axis.
Figure 17:
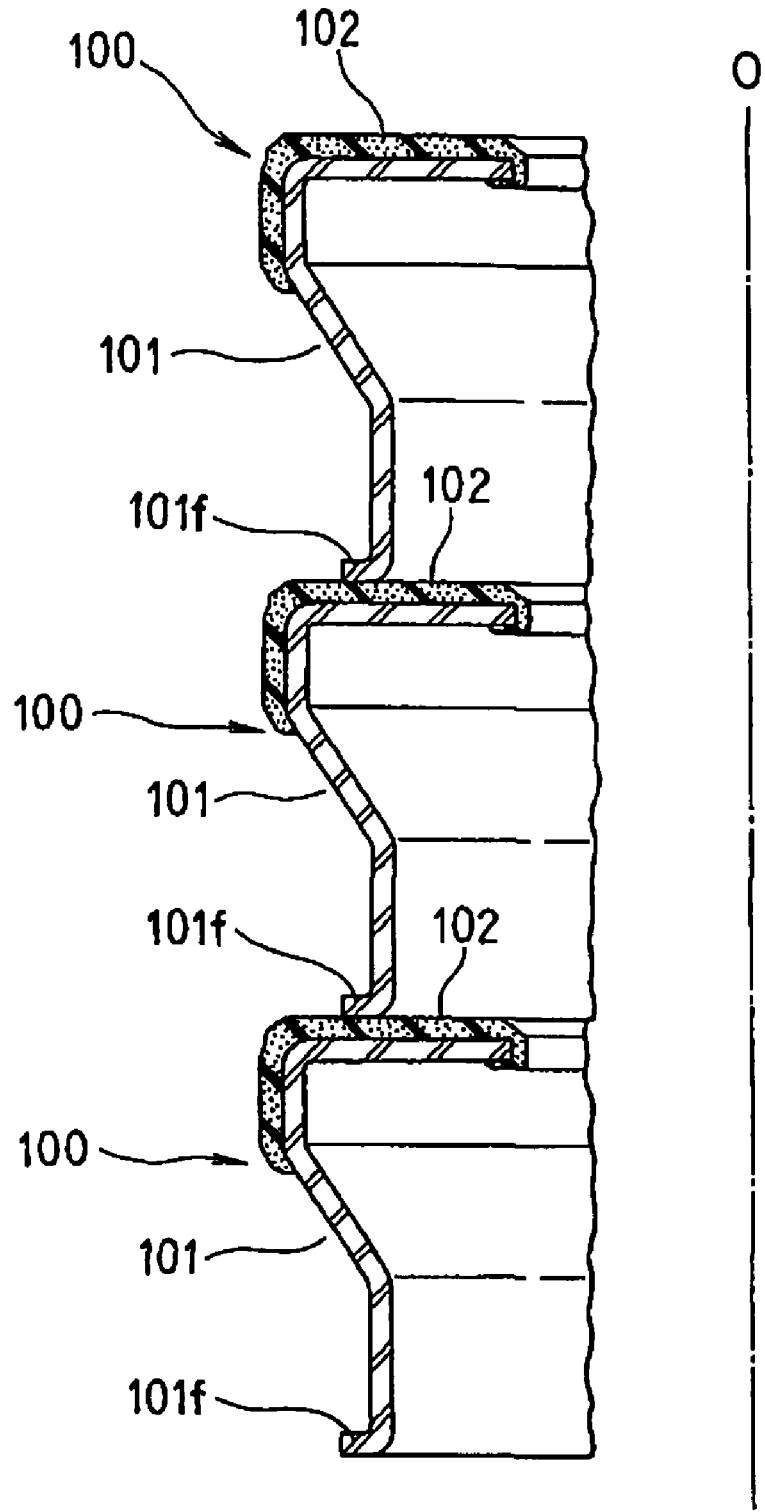
FIG. 17 is an explanatory view showing a state of accumulating the pulsar rings in FIG. 13 in such a manner that their axes are approximately vertical.
Figure 18:
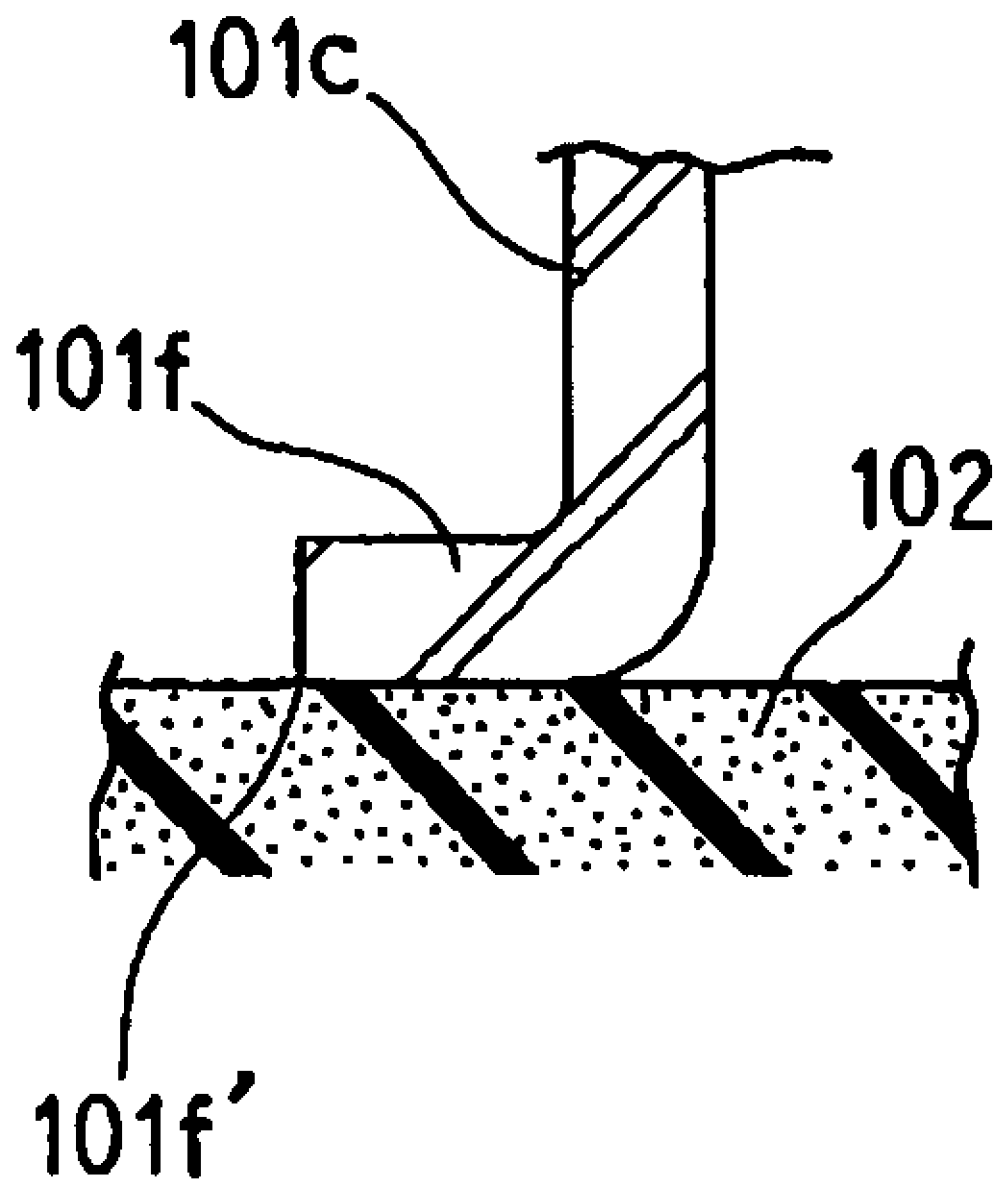
FIG. 18 is a partly cross sectional view showing a part of FIG. 17.

Next, FIG. 11 is a half cross sectional view of an installed state showing a fourth embodiment of the pulsar ring of the magnetic type rotary encoder in accordance with the present invention by cutting with a plane passing through an axis O, and FIG. 12 is a half cross sectional view showing a process of pressure inserting the pulsar ring in FIG. 11 to a rotating body by cutting with a plane passing through the axis. This embodiment is different from each of the embodiments mentioned above in a shape of the holder 10. The other portions are structured in the same manner as those in FIG. 9.

The holder 10 is manufactured by punching and press forming a metal plate such as an iron plate or the like, and is provided with the disc portion 11 to which the pulsar main body 20 is bonded, the mounting tube portion 12 having the smaller diameter than the outer diameter of the disc portion 11 and being fitted and fixed by pressure insertion to the outer circumferential surface of the rotating body 3 with the desired fastening margin, and the intermediate portion 13 extending in a collar shape at a position which is apart from the disc portion 11, toward the mounting tube portion 12 from the fold-back portion 15 at the outer circumference of the disc portion 11.

The disc portion 11 and the intermediate portion 13 of the holder 10 have a shape which is folded back in a diametrical direction via the fold-back portion 15 having the U-shaped cross section, and the gap 10a in the axial direction is formed between the disc portion 11 and the intermediate portion 13. It is preferable that the gap 10a is set to be 0.3 mm or more.

Further, in this embodiment, the pulsar main body 20 is provided only on the outer side surface 11a of the disc portion 11 of the holder 10, that is, constituted only by the disc-shaped magnetized portion 21.

In accordance with this structure, the structure is made such that the round-shaped outer circumferential convex surface 15a of the fold-back portion 15 in the holder 10 is fitted to the inner circumferential surface 42a of the circumferential wall portion 42 of the pressure inserting jig 4 at a time of fitting the pulsar ring 1 to the pressure inserting jig 4 arranged concentrically with the rotating body 3 as shown in FIG. 12 in the case of installing the pulsar ring 1 to the rotating body 3, whereby the pulsar ring 1 is held concentrically with the rotating body 3. Further, since the fold-back portion 15 is not forcedly collapsed in the axial direction, that is, the fold-back portion 15 is formed in a shape having the gap 10a in the axial direction between the disc portion 11 and the intermediate portion 13, it is possible to improve precision of the outer diameter D of the fold-back portion 15. As a result, it is possible to prevent inability of fitting to the pressure inserting jig 4, and prevent generation of a play.

Further, working oil is used at a time of press forming the holder 10, and a part of the working oil makes an intrusion into the gap 10a in the axial direction between the disc portion 11 and the intermediate portion 13, however, can be easily removed in the degreasing cleaning process executed as the preliminary treatment for integrally molding the pulsar main body 20 made of the magnetic rubber material on the holder 10. This is because the degreasing cleaning process can be efficiently executed by the cleaning fluid, if the gap 10a in the axial direction is 0.3 mm or more. Therefore, it is possible to prevent the problem that the remaining working oil within the gap 10a in the axial direction splashes in all directions at a time of using, or that the remaining working oil flows out from the gap 10a in the axial direction so as to spread to the adhesion surface and cause the adhesive failure at a time of vulcanizing and adhering the pulsar main body 20.

In this case, as for the pulsar rings 1 in FIG. 7 (the second embodiment), FIG. 9 (the third embodiment) and FIG. 11 (the fourth embodiment), the bent end 14 of the holder 10 can be formed as shown in FIG. 4 or 5 described previously.

INDUSTRIAL APPLICABILITY

In the present invention, since the pulsar ring 1 of the magnetic type rotary encoder detecting an angle of rotation or a rotating speed of the rotating body can be well held concentrically by the pressure inserting jig 4 at a time of installing to the rotating body 3, the present invention is useful for making the installation easy and preventing the installation failure due to the axial displacement.

What is claimed is:

1. A pulsar ring of a magnetic type rotary encoder comprising:
    an annular holder made of a metal; and
    a pulsar main body integrally formed on the holder by a magnetic rubber material,
    wherein said holder is provided with:
        a disc portion to which said pulsar main body is bonded,
        a mounting tube portion having a smaller diameter than an outer diameter of the disc portion and being fixed to a rotating body,
        a fold-back portion folded back from an outer circumference of said disc portion toward a location spaced apart from an inside surface of said disc portion so as to form a round convex surface at an outer circumferential side thereof, and
        an intermediate portion extending from the fold-back portion to said mounting tube portion, and
    wherein an outer circumferential portion of said pulsar main body is provided with a guide portion, the guide portion being:
        formed so as to surround an outer circumference of said fold-back portion,
        capable of coming into close contact with an inner circumferential surface of a cylindrical circumferential wall portion of a pressure inserting jig with a suitable collapsing margin, and
        formed in:
            a share continuously or intermittently protruding to an outer circumferential side in a circumferential direction, or
            a seal lip shape.

2. A pulsar ring of a magnetic type rotary encoder as claimed in claim 1, wherein a bent end inclined toward the mounting tube portion side than a plane which is vertical to an axis is formed at an end portion at an opposite side to the disc portion of the holder.

* * * * *